United States Patent Office 3,406,127
Patented Oct. 15, 1968

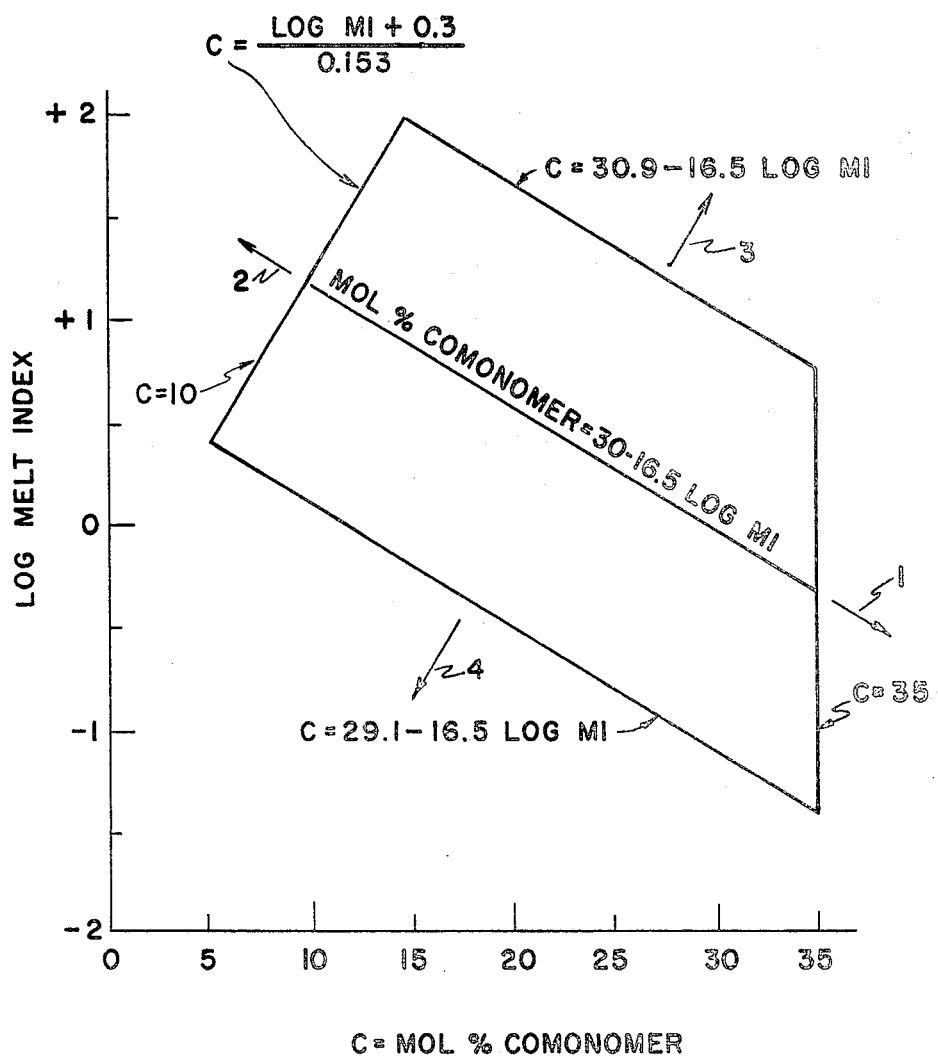

3,406,127
METHOD FOR RECLAIMING SCRAP POLYMERS
Richard L. Alexander, Orange, Tex., assignor to Gulf Oil Corporation, Pittsburgh, Pa., a corporation of Pennsylvania
Filed June 15, 1964, Ser. No. 375,239
33 Claims. (Cl. 260—2.3)

ABSTRACT OF THE DISCLOSURE

Low value organic polymers are upgraded by blending therewith a normally solid thermoplastic elastomer comprising a copolymer of ethylene and an unsaturated ester of a lower aliphatic carboxylic acid and an aliphatic alcohol, said copolymer having a particularly defined combination of melt index and comonomer concentration.

---

This invention relates to methods for reclaiming scrap polymers, which methods are also useful for upgrading low-value virgin materials. In a particular aspect the invention concerns compositions prepared by such methods and articles fabricated from such compositions.

A wide variety of scrap polymeric materials and low-value virgin materials are presently available as by-products of various manufacturing and processing industries. As illustrative examples of such scrap or low-value materials may be mentioned sawdust, bagasse, rice hulls, ground cork, animal hair, feathers, and various scrap synthetic polymers, particularly scrap thermosetting polymers such as, for example, foamed urethane, ground cured rubber and scrap foamed rubber. The term "organic polymer" is used herein as a convenient description of the type of materials illustrated hereabove, it being understood that this term is intended to include the various fibrillar cellulosic polymers, the various fibrillar proteinaceous polymers, and the various cured thermosetting polymers, particularly the synthetic cured thermosetting polymers.

It would be highly desirable and advantageous to have a method for reclaiming or upgrading such organic polymers which is both convenient and economical.

I have now discovered a method for upgrading such low value organic polymers comprising heating a normally solid thermoplastic elastomer to a temperature at least equal to the softening temperature of said elastomer, and simultaneously intimately and substantially homogeneously mixing with said elastomer an organic polymer filler of the type herein described and masticating the mixture of filler and heated elastomer to wet and form integuments for the divaricated filler particles, the thermoplastic elastomer comprising a copolymer of ethylene and an unsaturated ester of a lower aliphatic carboxylic acid having from 2 to 7 carbon atoms per molecule and an aliphatic alcohol of up to 18 carbon atoms per molecule, said copolymer having a combination of melt index (MI) and mol percent comonomer (C) falling within the area bounded by the curves $C=30.9-16.5 \log MI$, $C=29.1-16.5 \log MI$ $$C = \frac{\log MI + 0.3}{0.153}$$

and $C=35$, as shown in FIG. 1 of the drawings. By the above-described method of the invention one can produce novel suberose compositions comprising said thermoplastic elastomer and intimately and substantially homogeneously admixed with said elastomer, the finely divaricated organic polymer in amounts upwards of 80% by volume of said composition.

Depending upon the particular filler material employed in the aforesaid compositions, the novel compositions prepared in accordance with the method of the invention are useful in a wide variety of applications such as in the preparation of laminates, for example with paper or burlap substrates, which laminates are useful as paper, leather or rubber substitutes, and in the preparation of various padding material, for example for use in packaging and for use as carpet pads and the like. The novel compositions can be used as building materials such as for wall panels and ceiling tiles, in automotive applications such as headliners, floor mats and the like, as cork substitutes for example in bulletin boards and decorative applications and for use in molding compositions, for example to prepare various textured articles such as picture frames and the like.

The filler materials employed in the methods and compositions of the invention are broadly described as organic polymers, including as general types the fibrillar cellulosic polymers, the fibrillar proteinaceous polymers and the cured synthetic thermosetting polymers.

As specific examples of the cellulosic polymers may be mentioned sawdust, jute, peat moss, cork, grass, bagasse, pine needles, pine cones, rice hulls, flaxseal, cotton, excelsior and sisal. As examples of the proteinaceous polymers may be mentioned hair, especially various animal hairs, and feathers of various types. As examples of cured thermosetting polymers may be mentioned various cured synthetic thermosetting polymers such as ground cured synthetic rubber, for example that produced as a by-product of the tire-recapping process, and various cured foamed thermosetting polymers, for example foamed polyurethanes and the like.

Of course, mixtures of one or more fillers of the aforesaid type can also be employed in the novel methods and compositions herein described, for example, mixtures of cotton and polyurethane, rice hulls and peat moss, sawdust, and so forth. By this method it is possible to tailor the specific properties of the compositions as desired.

The thermoplastic elastomer employed in the method and compositions of the invention is a normally solid thermoplastic elastomer comprising a copolymer of ethylene having copolymerized therein a polymerizable unsaturated ester of a lower aliphatic carboxylic acid having from 2 to 7 carbon atoms per molecule and a lower aliphatic alcohol of up to 18 carbon atoms per molecule, for example, esters of acetic, acrylic and methacrylic acids with vinyl, methyl, ethyl, t-butyl, hexyl, stearyl and lauryl alcohols. As shown in the drawing only a certain class of these copolymers can be suitably employed in the invention, namely those which have a combination of melt index (MI) and comonomer content (C) falling within the area bounded by the curves $$C = 30.9 - 16.5 \log MI$$
$$C = 29.1 - 16.5 \log MI$$

$$C = \frac{\log MI + 0.3}{0.153}$$

and $$C = 35$$

The presently preferred class of copolymers are those falling on the line $C=30-16.5 \log MI$ shown on the drawing.

As shown in the drawing the presently known upper limit of comonomer content in the elastomer is about 35 mol percent. While somewhat higher comonomer contents are believed to be suitable it is known that as the properties of the polymer move in the direction of the arrow 1 and at somewhere around 50 mol percent or higher comonomer content, the properties of the elastomer begin to reverse and the properties of the polymer begin to approach the properties of the pure polymerized comonomer, e.g., hard, inelastic, etc.

If the properties of the elastomer move outside the suitable area in the direction of the arrow 2 the filled compositions will be increasingly brittle and have poor flexural properties.

If the properties of the elastomer move outside the suitable area in the direction indicated by the arrow 3 the elastomer will become increasingly exceedingly soft or liquid and the filled compositions will have unacceptable mechanical strength.

If the properties of the elastomer move outside the suitable area in the direction indicated by the arrow 4 the polymer will be increasingly stiff and difficult to fill with high loadings of fillers.

The aforesaid suitable elastomers have the capability of being filled with extremely high volume percentages of the above described filler materials. They are as a class characterized by being "tacky" in the unfilled state and are capable of wetting and forming integuments for the finely divaricated particles of filler contained in the compositions of the invention. As a class they have the capability of adhering firmly to the filler particles and when the filled compositions are masticated, this results in divarication or pulling apart of the filler particles.

A preferred class of the above described elastomers having melt indexes from 5 to 100 are copolymers of ethylene with esters of a lower aliphatic carboxylic acid having from 2 to 7 carbon atoms per molecule and a lower aliphatic alcohol of up to 4 carbon atoms per molecule, a particularly preferred group of these copolymers being the class consisting of copolymers of ethylene with lower alkyl acrylates, lower alkyl methacrylates, and vinyl acetate. Thus, typical elastomers of the type described which are employed in the preferred practice of the invention are copolymers of ethylene with methyl acrylate, ethyl acrylate, butyl acrylate, t-butyl acrylate, methyl methacrylate, t-butyl methacrylate, and vinyl acetate.

The novel compositions herein described are prepared in accordance with my invention by the following method.

The thermoplastic elastomer component of the compositions is heated to a temperature at which it becomes soft and workable, for example, by working the polymer on a pair of mixing rolls, one of which is heated to a suitably elevated temperature, e.g., 40–100° C. higher than the Vicat softening point of the elastomer. The requisite quantity of filler material is then added at a rate for good mixing with the heated elastomer, suitably in several aliquot portions or continuously over a period of time, to the heated elastomer. In most cases, the fillers may be added directly to the heated elastomer without previous comminution. For example, materials such as rice hulls, sawdust, cotton, bagasse, pine needles, and the like need not be first cut or reduced in size to smaller particles as this will be accomplished in situ in the further masticating of the mixture. In some cases, for example, in the case of very large pieces of scrap urethane foam or cured synthetic rubber or other unsuitably large pieces of filler material, the preparation of the compositions is facilitated by first reducing the scrap or low-value material to a smaller particle size.

It is a surprising and important feature of the invention that as the thermoplastic elastomer and the filler composition is masticated on the mixing rolls the filler is continually reduced in particle size by the divaricating action of the polymer. Thus, a wide range of textures can be obtained simply by varying the time during which the composition is masticated on the mixing rolls. Thus, for example, in the case of rice hull-filled compositions which are fabricated into sheet form I have succeeded in obtaining surface textures which vary from a rather rough, irregular surface to a practically completely smooth suface merely by varying the time of mastication of the composition. These varying textures are used to provide a number of aesthetically pleasing effects.

After the filled compositions have been masticated for a length of time sufficient to provide the desired degree of divarication of the filler particles, the compositions may then be fabricated into suitable form for storage, transportation or use. For example, they may be simply sheeted off of the mixing rolls and cooled.

In addition to the thermoplastic elastomer and the filler components, the compositions may also contain effective quantities of materials such as pigments, blowing agents, anti-oxidants, lubricants, decorative metal flakes and the like, cross-linking agents, and various special purpose additives such as starch, to modify the characteristics of the compositions to produce special properties as desired.

The compositions hereabove described can be used in the form of sheets, can be fabricated by compression molding techniques into molded shapes, can be used to prepare laminates with various substrates, and can be fabricated into special shapes and forms such as "quilted" or corrugated sheets and the like by techniques which are common in the art.

Of prime importance to the practical utility of the invention is the surprising amount of filler material which can be incorporated into a relatively small amount of the thermoplastic elastomer employed. Thus, I have successfully produced filled compositions as herein described containing upwards of 70–80 percent by volume of the total composition. Obviously there are, however, times when the desired quantity of filler material may be as low as 30 volume percent of the composition, for example, where the compositions are to be used as relatively high cost decorative materials.

Although I have described the preparation of the aforesaid novel compositions employing mixing rolls, these compositions may also be prepared in a variety of other ways including the use of calenders, Banbury mixers, and other common polymer mixing and compounding apparatus.

Upon examination of the filled compositions of the invention under a magnifying glass it has been observed that the thermoplastic elastomer does not merely act as an adhesive disposed between adjacent filler particles but, rather, it appears that a substantial portion, in fact a generally major portion of the filler particles are actually substantially completely surrounded by and imbedded within integuments of the thermoplastic elastomer material. This structure is believed to be a major factor contributing to the specially advantageous properties of these compositions. For example, one can fabricate such compositions into practically paper-thin sheets with surprisingly excellent mechanical strength properties. Also, these compositions, even in forms having relatively thick cross-sections, have surprising flexibility and resiliency. Furthermore, the thermoplastic elastomer integuments appear to substantially prevent deterioration of otherwise quickly degradable materials. For example, I have prepared such compositions containing upwards of 50 weight percent freshly-mown grass. The samples of these compositions, even when exposed to direct sunlight over extended periods of time, have shown very little, if any, depreciation in properties or appearance as might be otherwise expected if the grass filler decayed at the normal rate.

Where it is desired that the compositions have a lower density than would be ordinarily obtainable, a blowing agent may be incorporated into the compositions during the masticating step. Then, after the mastication step has been completed and the material fabricated into shapes such as sheets and the like, the blowing may be accomplished by heating the compositions to a temperature above the blowing temperature of the blowing agent. This technique is particularly useful in increasing the resiliency and decreasing the density of the resulting blown compositions. Such techniques would be particularly applicable to the preparation of padding material and the like, for example, in the manufacture of rug pads, life preserver fillers and the like.

The following examples are presented to further illustrate the invention and the preferred embodiments thereof.

Unless otherwise indicated, in each of the following examples the compositions prepared were obtained by heating the thermoplastic elastomer on a standard roll mill, one roll being heated to a temperature of 50–80° C. above the Vicat softening temperature of the elastomer. The elastomer is premelted on the roll and the filler is then added at a rate suitable for good mixing. The mixing and mastication of the composition is continued until the desired texture is obtained and the compositions are then sheeted off at various thicknesses and allowed to cool.

EXAMPLE 1

This example illustrates the preparation of representative elastomer-filler compositions. The following thermoplastic elastomers were employed in preparing these compositions:

Resin A.—A copolymer of ethylene with 8.9 mol percent methylacrylate; melt index equal 8.0.
Resin B.—A copolymer of ethylene with 13.5 mol percent methyl-methacrylate; melt index equal 11.0.
Resin C.—A copolymer of ethylene with 12.3 mol percent vinyl acetate; melt index equal 18.0.

The compositions employed and some properties of these compositions are shown in Table 1.

TABLE I

| Thermoplastic Elastomer | Filler | Wt. Percent Filler in Composition | Tensile Strength, p.s.i. | Elongation, percent |
|---|---|---|---|---|
| Resin A | | 0 | 740 | 830 |
| Do | Jute | 50 | 285 | 39 |
| Do | Peat moss | 50 | 367 | 25 |
| Do | Paper | 50 | 847 | 24 |
| Do | do | 75 | 282 | 20 |
| Do | Grass | 50 | 528 | 35 |
| Do | Bagasse | 50 | 284 | 25 |
| Do | do | 70 | 399 | 8 |
| Do | Pine needles | 50 | 339 | 24 |
| Do | Sawdust | 50 | 598 | 24 |
| Do | do | 70 | 123 | 24 |
| Do | Spanish moss | 50 | 385 | 190 |
| Do | Foamed rubber | 43 | 224 | 124 |
| Do | Cotton | 40 | 1,065 | 39 |
| Do | Polyurethane foam | 36 | 155 | 98 |
| Do | do | 61 | | |
| Do | Ground cured rubber | 50 | 218 | 123 |
| Do | do | 70 | 359 | 178 |
| Do | Rice hulls | 50 | 303 | 24 |
| Do | do | 60 | | |
| Do | do | 80 | 410 | 15 |
| Resin C | do | 70 | 407 | 16 |
| Resin B | do | 60 | 314 | 95 |
| Do | do | 80 | 409 | 17 |
| Resin C | Sawdust | 72 | 301 | 18 |
| Do | Hair | 63 | | |
| Resin A | Excelsior | 60 | 208 | 25 |

EXAMPLE 2

This example illustrates the preparation of compositions containing mixtures of two or more fillers. The resins of Example 1 were employed.

The compositions prepared are shown in Table 2.

TABLE 2

Thermoplastic elastomer—
Resin A:                           Filler, wt. percent
    Excelsior _____ 50
    Cotton _____ 11
    Urethane foam _____ 4
Resin B:
    Bagasse _____ 31.3
    Vermiculite _____ 24.9
    Polyurethane foam _____ 12.5
Resin C:
    Sawdust _____ 50
    Ground cured rubber _____ 22

EXAMPLE 3

A composition is prepared which contained 65 wt. percent foamed urethane and the balance Resin C. This composition is heat-treated in an oven maintained at a temperature of 350° F. to "puff" the composition. The density of the heat-treated materials is 0.21 g./cc. as compared with a density of 0.33 for the untreated composition.

The puffed composition has excellent resiliency properties and is comparable in many respects to virgin foamed polyurethane.

EXAMPLE 4

The use of blowing agents in the typical compositions of Example 1 will in general result in blown compositions having significantly reduced density, particularly where the compositions have been masticated for a length of time sufficient to reduce the filler to a small particle size. For example, a composition comprising 50 wt. percent rice hulls, 4% blowing agent, 1% stearic acid and the balance Resin A, which composition is milled for 15 minutes on the mixing rolls yields a superior "blown" product.

EXAMPLE 5

This example illustrates the preparation of laminates of the novel compositions with various substrates.

The Resin A-ground cured rubber composition of Example 1 was used to prepare laminates with the following substrates:

TABLE 3

Plies of substrate:            Plies of Resin A-ground cured rubber composition
    7 plies of burlap _____ 9
    7 plies of paper _____ 9
    1 ply of cheesecloth _____ 2
    4 plies of Mylar sheet _____ 6
    5 plies of polypropylene film _____ 7
    1 ply of polyethylene film _____ 2
    1 ply of nylon film _____ 2
    6 plies of aluminum foil _____ 8

These laminates were prepared by compression molding alternate sheets of the resin-rubber composition and the indicated substrates in a laminating press under a pressure of 10–20 tons/sq. in. at a temperature of 350–400° F. The laminates are useful as substitutes for common commercial laminates, papers, leather and the like.

EXAMPLE 6

This example illustrates the preparation of pigmented compositions.

The following compositions were prepared in accordance with the method of Example 1 except that various pigments were added to the compositions during the masticating step.

TABLE 4

| Thermoplastic Elastomers | Filler, wt. percent | Pigment |
|---|---|---|
| Resin A | Sawdust 60 | 0.5 wt. percent Cadmium Sel. Red (Kentucky Color & Chem. Co.). |
| Do | Rice Hulls 60 | 1.5 wt. percent Cadmium Sel Red (Kentucky Color & Chem. Co.). |
| Do | Sawdust 70 | 1.0 wt. percent Phthalo Blue (Western Dry Color Co.). |

EXAMPLE 7

This example illustrates the preparation of carpet pads employing typical compositions of the invention containing scrap urethane foam as a filler.

The compositions indicated in Table 5 were prepared by melting the thermoplastic elastomer (Resin A) on a pair of mixing rolls, one of which is maintained at 225° F. and the other which is maintained at ambient temperature. Thereafter the indicated amount of scrap urethane foam was added to the mixing rolls at a rate for adequate mixing (about 5–10 minutes).

TABLE 5

| Sample Nos. | Wt. percent Copolymer | Wt. percent Urethane Foam |
| --- | --- | --- |
| Sample 1 | 100 | |
| Sample 2 | 83.3 | 16.7 |
| Sample 3 | 67.0 | 33.0 |
| Sample 4 | 50.0 | 50.0 |
| Sample 5 | 33.0 | 67.0 |
| Sample 6 | 26.7 | 73.3 |
| Sample 7 | 100 | 0 |
| Sample 8 | 83.4 | 16.6 |
| Sample 9 | 66.7 | 33.3 |
| Sample 10 | 50 | 50 |
| Sample 11 | 33.4 | 66.6 |
| Sample 12 | 26.7 | 73.3 |

Samples 7–12 were heat treated at 350° F. for 2–3 minutes at atmospheric pressure to "puff" the compositions.

The samples described in Table 5 containing less than 50 wt. percent elastomer were sheeted off the mixing rolls in the desired thicknesses. Thereafter the samples were allowed to cool to room temperature. The samples described above in Table 5 containing more than 50 wt. percent elastomer could not be sheeted off of the mixing rolls and the charge had to be pressed mechanically into a sheet after it had cooled. Puffing of these sheets required approximately 10 minutes at 425° F.–450° F. Puffing was irregular resulting in non-uniform cell size and bubbles.

By contrast, those samples containing less than 50 wt. percent copolymer could be sheeted directly off the rolls and during the puffing step the expansion was uniform.

Sample No. 11 was sheeted into a ¾₁₆ inch sheet and, after blowing, a waffle pattern was impressed into the sheet while it was still warm by pressing the warm sheet with a waffle die. This produced a foamed sheet of approximately ⁵⁄₁₆ inch thickness which has the proper resiliency for use as a carpet pad. This pad can be produced at a cost comparable to the cost of presently available cotton-phenolic pads and has the advantages of improved water resistance, compressor set, insect and mildew resistance. This same technique can be applied to samples 9, 10, 11 and 12.

The method of this example has the advantage that any scrap or die cuttings can be reprocessed in the same manner as the original urethane scrap. Such pads can also be used for protective packaging, seat cushions, mattresses and the like.

EXAMPLE 8

This example illustrates the use of a cross-linking agent to modify the properties of the compositions of the invention. A composition was prepared according to sample 5 of Example 7 except that it contained 4.0 wt. percent of a crosslinking agent (dicumyl peroxide). The waffled pad prepared from this composition according to the method of Example 6 was significantly more resistant to deformation under a compressive load but recovered its orginal dimensions when the load was removed.

EXAMPLE 9

This example illustrates the use of the compositions of the invention in the fabrication of shaped articles.

A composition containing Resin B and 80 wt. percent rice hulls was prepared and milled for 15 minutes. This composition was compression molded into the shape of a small picture frame employing a press pressure of 5 tons and a mold temperature of 350° F. The mold filling properties of the composition was quite satisfactory and the picture frame thus prepared had entirely adequate mechanical strength and a pleasing aesthetic appearance.

EXAMPLE 10

This example illustrates the preparation of laminates of the novel compositions of the invention containing a ground cured rubber filler (20 mesh) with various substrates.

A composition was prepared according to the technique of Example 1 containing Resin A and 67 wt. percent of 20 mesh ground cured rubber. This composition was sheeted into 75 and 35 mil sheets. The following laminates were prepared by compression molding:

Laminate No. 1

75 mil sheet—6 alternating kraft paper and 35 mil sheets—75 mil sheet.

Laminate No. 2

75 mil sheet—6 alternating polypropylene film and 35 mil sheets—75 mil sheet.

Laminate No. 3

75 mil sheet—4 alternating burlap and 35 mil sheets—75 mil sheet.

These laminates were molded at 325–350° F. for one and one half minutes at 3 tons pressure, then cooled under 4 tons pressure. The laminates were trimmed after cooling.

The mechanical properties of the laminates are shown in Table 6.

TABLE 6

| Laminate No. | Shear Strength, p.s.i. | Tensile at Break, p.s.i. | Elongation, percent | Flexural Stiffness, p.s.i. |
| --- | --- | --- | --- | --- |
| 1 | 1,400 | 550 | 320 | 13,000 |
| 2 | 1,100 | 770 | 300 | 2,100 |
| 3 | 2,000 | | | 7,400 |

EXAMPLE 11

This example illustrates the flexural characteristics of these novel compositions filled with 60% (by weight) rice hulls. The results shown in Table 7 include not only the resins discussed above, but, in addition, various other resins prepared in accordance with this invention and more particularly identified below.

The flexural characteristics were obtained in accordance with known procedures which generally comprise reversibly bending a specimen to failure. Each cycle, noted in Table 7, comprised bending a specimen through an angle of about 80°, then reversely bending the specimen through an angle of about 160°, and then again reversely bending the specimen through an angle of 80° to about its original position.

TABLE 7

| | Comonomer* | Mol Percent Comonomer | MI | Flex Cycle to Fail |
| --- | --- | --- | --- | --- |
| Polymer D | MA | 12.2 | 6.2 | 40 |
| Polymer E | MA | 20.0 | 7.8 | 42 |
| Polymer B | MMA | 13.5 | 11.0 | 24 |
| Polymer F | EA | 21.8 | 30.0 | 14 |
| Polymer G | MMA | 10.0 | 9.6 | 13 |
| Polymer C | VA | 12.5 | 18.0 | 13 |
| Polymer A | MA | 8.8 | 7.5 | 4 |
| Polymer H | MA | 7.5 | 1.9 | 2 |
| Polymer I | MMA | 8.3 | 1.8 | 1 |

*MA—Methyl acrylate. MMA—Methyl methacrylate. VA—Vinyl acetate. EA—Ethyl acrylate.

Having described my invention and the preferred embodiments thereof, I claim:

1. A *suberose* composition comprising:
   (a) a normally solid thermoplastic elastomer comprising a copolymer of ethylene having copolymerized therein a polymerizable unsaturated ester of a lower aliphatic carboxylic acid having from 2 to 7 carbon atoms per molecule and a lower aliphatic alcohol of up to 18 carbon atoms per molecule and having a combination of melt index (MI) and comonomer content (C) falling within the areas bounded by the curves $C = 30.9 - 16.5 \log MI$, $C = 29.1 - 6.5 \log MI$.

$$C = \frac{\log MI + 0.3}{0.153}$$

and $$C = 35$$

(b) intimately and substantially homogeneously admixed with said elastomer, a finely divaricated reclaimable organic polymer in an amount up to about 80% by weight of said composition.

2. Composition of claim 1 wherein said polymer is a fibrillar cellulosic polymer.

3. Composition of claim 1 wherein said polymer is a fibrillar proteinaceous polymer.

4. Composition of claim 1 wherein said polymer is a cured thermosetting elastomer.

5. Composition of claim 1 wherein said ester is a lower alkyl acrylate.

6. Composition of claim 5 wherein said ester is methyl acrylate.

7. Composition of claim 1 wherein said ester is a lower alkyl methacrylate.

8. Composition of claim 7 wherein said ester is methyl methacrylate.

9. Composition of claim 1 when said ester is vinyl acetate.

10. A suberose composition comprising:
 (a) a normally solid thermoplastic elastomer comprising a copolymer of ethylene having copolymerized therein a polymerizable unsaturated ester of a lower aliphatic carboxylic acid having from 2 to 7 carbon atoms per molecule and a lower aliphatic alcohol of up to 18 carbon atoms per molecule and having a combination of melt index (MI) and comonomer content (C) falling within the areas bounded by the curves $C=30.9-16.5 \log MI$, $C=29.1-6.5 \log MI$ $$C = \frac{\log MI + 0.3}{0.153}$$

and $$C = 35$$

(b) intimately and substantially homogeneously admixed with said elastomer a reclaimable fibrillar cellulosic polymer in an amount comprising at least about 50% by weight of said composition.

11. Composition of claim 10 wherein said ester is methyl acrylate.

12. Composition of claim 10 wherein said ester is methyl methacrylate.

13. Composition of claim 10 wherein said cellulosic polymer is cotton.

14. Composition of claim 10 wherein said cellulosic polymer is rice hulls.

15. Composition of claim 10 wherein said cellulosic polymer is jute.

16. Composition of claim 10 wherein said cellulosic polymer is paper.

17. Composition of claim 10 wherein said cellulosic polymer is bagasse.

18. A suberose composition comprising:
 (a) a normally solid thermoplastic elastomer comprising a copolymer of ethylene having copolymerized therein a polymerizable unsaturated ester of a lower aliphatic carboxylic acid having from 2 to 7 carbon atoms per molecule and a lower aliphatic alcohol of up to 18 carbon atoms per molecule and having a combination of melt index (MI) and comonomer content (C) falling within the areas bounded by the curves $C=30.9-16.5 \log MI$, $C=29.1-6.5 \log MI$ $$C = \frac{\log MI + 0.3}{0.153}$$

and $$C = 35$$

(b) intimately and substantially homogeneously admixed with said elastomer, a finely divaricated reclaimable synthetic organic thermosetting polymer in an amount comprising at least about 30% by weight of said composition.

19. Composition of claim 18 wherein said thermosetting polymer is a cured rubber.

20. Composition of claim 18 wherein said thermosetting polymer is a foamed polyurethane.

21. Composition of claim 18 wherein said thermosetting polymer is a foamed cured rubber.

22. A suberose composition comprising:
 (a) a normally solid thermoplastic elastomer comprising a copolymer of ethylene having copolymerized therein a polymerizable unsaturated ester of a lower aliphatic carboxylic acid having from 2 to 7 carbon atoms per molecule and a lower aliphatic alcohol of up to 18 carbon atoms per molecule and having a combination of melt index (MI) and comonomer content (C) falling within the areas bounded by the curves $C=30.9-16.5 \log MI$, $C=29.1-6.5 \log MI$ $$C = \frac{\log MI + 0.3}{0.153}$$

and $$C = 35$$

(b) intimately and substantially homogeneously admixed with said elastomer, a finely divaricated reclaimable fibrillar proteinaceous polymer in an amount comprising at least about 50% by weight of said composition.

23. Composition of claim 22 wherein said proteinaceous polymer is hair.

24. Composition of claim 22 wherein said proteinaceous polymer is feathers.

25. A process for preparing a suberose composition comprising:
 (a) heating a normally solid thermoplastic elastomer to a temperature at least 40–100° C. above the Vicat softening temperature of said elastomer; and
 (b) simultaneously
  (1) intimately and substantially homogeneously mixing with said elastomer a reclaimable thermosetting organic polymer, and
  (2) masticating the mixture of said organic polymer and heated elastomer for a time sufficient to divaricate said organic polymer and to cause said elastomer to wet and form integuments for divaricated organic polymer particles, said thermoplastic elastomer comprising a copolymer of ethylene having copolymerized therein a polymerizable unsaturated ester of a lower aliphatic carboxylic acid having from 2 to 7 carbon atoms per molecule and a lower aliphatic alcohol of up to 18 carbon atoms per molecule and having a combination of melt index (MI) and comonomer content (C) falling within the areas bounded by the curves $$C=30.9-16.5 \log MI, \quad C=29.1-6.5 \log MI$$

$$C = \frac{\log MI + 0.3}{0.153}$$

and $$C = 35$$

26. Process of claim 25 wherein said unsaturated ester is a lower alkyl acrylate.

27. Process of claim 25 wherein said unsaturated ester is methyl methacrylate.

28. Process of claim 25 wherein said unsaturated ester is vinyl acetate.

29. A process for preparing a suberose composition comprising:
 (a) heating to a temperature of from about 50 to about 80° C. above its Vicat softening temperature, a normally solid thermoplastic elastomer comprising a copolymer of ethylene having copolymerized therein a polymerizable unsaturated ester of a lower aliphatic carboxylic acid having from 2 to 7 carbon atoms per molecule and a lower aliphatic alcohol of up to 18 carbon atoms per molecule and having a combination of melt index (MI) and comonomer content (C) falling within the areas bounded by the curves $$C = 30.9 - 16.5 \log MI, \quad C = 29.1 - 6.5 \log MI$$

$$C = \frac{\log MI + 0.3}{0.153}$$

and $$C = 35$$

(b) admixing with the heated elastomer a comminuted reclaimable thermosetting organic polymer;

(c) masticating the heated elastomer-organic polymer admixture for a time sufficient to divaricate said organic polymer to the desired degree, to cause said elastomer to form integuments for divaricated organic polymer particles, and to form an intimate and substantially homogeneous mixture of said elastomer and said organic polymer particles; and (d) cooling said substantially homogeneous mixture.

30. Process of claim 29 wherein said heating, admixing and masticating steps are carried out on a calender mill.

31. A process for preparing a low-density suberose composition comprising the steps of claim 29 wherein a blowing agent is incorporated into the mixture of elastomer and reclaimable organic polymer during the mixing and masticating steps, and said composition is thereafter heated to a temperature at least above the blowing temperature of said blowing agent.

32. A laminate comprising at least one substrate and the composition of claim 1 bonded thereto.

33. The composition of claim 1 in the form of a molded shaped article.

References Cited

UNITED STATES PATENTS

| | | | |
|---|---|---|---|
| 2,927,904 | 3/1960 | Cooper | 260—4 |
| 3,073,371 | 1/1963 | Leeper | 260—4 |
| 3,272,890 | 9/1966 | O'Leary | 260—859 |

FOREIGN PATENTS

| | | |
|---|---|---|
| 805,561 | 12/1958 | Great Britain. |

MURRAY TILLMAN, *Primary Examiner.*

W. J. BRIGGS, SR., *Assistant Examiner.*